ously when a knock is generated, an amplifier for amplifying the output signal of the filter, an averaging/amplifying device for macroscopically averaging and amplifying the output signal of the filter, a comparator for comparing the output of the amplifier with those of the averaging/amplifying device and producing an output signal when the former is larger than the latter, an engine rpm detector for detecting the engine speed, and a voltage signal generator circuit responsive to the output signals of the comparator and the engine rpm detector and having an output of an amplitude corresponding to the ignition advance angle determined in accordance with the engine rpm, the voltage signal generator circuit changing the amplitude of the output voltage thereof in a manner to retard the ignition advance angle by a predetermined amount in response to an output signal of the comparator.

United States Patent [19]

Sugiura et al.

[11] Patent Number: 4,495,918
[45] Date of Patent: Jan. 29, 1985

[54] IGNITION TIMING RETARD ANGLE CONTROL APPARATUS FOR INTERNAL COMBUSTION ENGINE

[75] Inventors: Noboru Sugiura; Terumi Okado, both of Katsuta, Japan

[73] Assignee: Hitachi, Ltd., Tokyo, Japan

[21] Appl. No.: 211,288

[22] Filed: Nov. 28, 1980

[30] Foreign Application Priority Data

Nov. 30, 1979 [JP] Japan .................. 54-154263
Nov. 30, 1979 [JP] Japan .................. 54-154264

[51] Int. Cl.³ .............................................. F02P 5/04
[52] U.S. Cl. ......................................... 123/425; 73/35
[58] Field of Search ............................ 123/425; 73/35

[56] References Cited

U.S. PATENT DOCUMENTS 4,002,155 1/1977 Harned et al. ...................... 123/425
4,111,035 9/1978 West et al. ............................. 73/35
4,423,621 1/1984 Kenichi ............................ 123/425 X Primary Examiner—Tony M. Argenbright
Attorney, Agent, or Firm—Antonelli, Terry & Wands

[57] ABSTRACT

An ignition retard angle control apparatus for an internal combustion engine is disclosed. This control system comprises a vibration sensor for detecting engine vibrations, a filter for discriminating part of the output of the sensor in a characteristic frequency range where a knock-induced vibration component appears remarkably when a knock is generated, an amplifier for amplifying the output signal of the filter, an averaging/amplifying device for macroscopically averaging and amplifying the output signal of the filter, a comparator for comparing the output of the amplifier with those of the averaging/amplifying device and producing an output signal when the former is larger than the latter, an engine rpm detector for detecting the engine speed, and a voltage signal generator circuit responsive to the output signals of the comparator and the engine rpm detector and having an output of an amplitude corresponding to the ignition advance angle determined in accordance with the engine rpm, the voltage signal generator circuit changing the amplitude of the output voltage thereof in a manner to retard the ignition advance angle by a predetermined amount in response to an output signal of the comparator.

16 Claims, 19 Drawing Figures

IGNITION TIMING RETARD ANGLE CONTROL APPARATUS FOR INTERNAL COMBUSTION ENGINE

BACKGROUND OF THE INVENTION

The present invention relates to an apparatus for controlling the retard angle of ignition timing of an internal combustion engine, or more in particular to an apparatus for minimizing an audible knock in an internal combustion engine by retarding ignition timing, when necessary, from the normally set ignition timing in response to the signal from an engine-mounted vibration sensor.

The knock generated in an engine, as well known, reduces the torque and the operating efficiency of the engine or damages the engine by overheat. This knock is greatly affected by the ignition timing. The output of the engine at a given speed increases with the advance of the ignition timing, that is, with the increase in advance angle. With the increase in advance angle, however, a knock occurs undesirably at a certain time point. If the advance angle is reduced excessively to avoid the knock, on the other hand, the output is reduced. The ignition timing, therefore, is required to be regulated to occur immediately before the time point at which a knock will occur. In order to meet this requirement, the knock conditions are detected so that the ignition timing is controlled in accordance with the generation of knocks.

In this knock control, the occurrence of a knock is generally detected by an engine-mounted vibration sensor. This vibration sensor detects engine vibrations and produces an output corresponding to the vibrations in the form of an electrical signal. An engine vibration is a combination of not only a knock but also the inherent vibration of the engine, vibrations due to the explosion of the air-mixed fuel at the time of ignition and other vibrations. The vibration due to the explosion at the time of ignition is very great and eliminated from the output of the vibration sensor by nullifying the output per se or the like. The output of the vibration sensor is thus divided roughly into a knock signal component based on a knock or a similar vibration having a large amplitude especially at or in the vicinity of a characteristic frequency and a background signal component having a small amplitude distributed over a wide frequency range and based on the inherent vibrations of the engine or the like.

In conventional methods of knock detection, the output signal of the vibration sensor is applied to a band-pass filter which passes only the frequency range including the characteristic frequency at the center thereof, and the output signal of the band-pass filter is compared with a reference voltage. The output signal of the band-pass filter is a combination of the knock signal component and the background signal component in the presence of a knock, while it contains only the background signal component in the absence of a knock. The reference voltage applied to the comparator is set at a level higher than the peak of the background signal component, which level is exceeded by the peak of a signal composed of the knock signal component and the background signal component in the presence of a knock, thereby making it possible to detect the existence of a knock.

A prior art and an improvement thereof for detecting knock by the use of a band-pass filter and a comparator for processing the output of the vibration sensor as mentioned above is disclosed in U.S. Pat. No. 4,111,035 issued to West et al. on Sept. 5, 1978 and assigned to General Motors Corporation. In West et al., in addition to the band-pass filter and the comparator in the prior art there is further provided, as means for correcting mistuned states with respect to the characteristic frequency of the vibration sensor, a low-pass filter through which the output of the comparator is fed back to the input of the same comparator. In the conventional methods including West et al., however, the output of the band-pass filter is directly applied to the comparator, thereby posing a practical problem of low knock detecting accuracy. In view of the fact that an increased gain of the band-pass filter causes a distortion of the output thereof, the gain thereof is unavoidably reduced. When the output of the band-pass filter is small, the direct application thereof to the comparator for comparison with a reference value may cause a malfunction in which a knock fails to be detected.

SUMMARY OF THE INVENTION

It is an object of the present invention to provide a highly accurate knock detecting system obviating the above-mentioned disadvantages of the prior art.

The ignition timing control system disclosed in the copending U.S. patent application Ser. No. 104,717, now U.S. Pat. No. 4,307,691, "IGNITION TIMING CONTROL SYSTEM FOR INTERNAL COMBUSTION ENGINE" filed on Dec. 18, 1979 by applicants including Noboru Sugiura, one of the inventors of the present invention, and assigned to the same assignee as that of the present application, comprises means for generating a reference ignition signal, means for advancing the ignition timing before the time point of generation of the reference ignition signal in accordance with the number of revolution per unit time (hereinafter referred to as "rpm") of the engine, means for controlling the ignition timing on the basis of the pressure variations in the intake pipe depending on the engine load, means for retarding the ignition timing by a predetermined angle from the ignition timing determined by the advancing means, an atmospheric pressure sensor for producing a change in atmospheric pressure in the form of a voltage signal, and means for further controlling the retard angle of the retarding means in accordance with the output voltage signal of the atmospheric pressure sensor.

Another object of the present invention is to provide an ignition retard angle control apparatus for producing a knock control signal in the form of a voltage signal for controlling the retard angle in parallel to or in place of the output voltage signal of the atmospheric pressure sensor, in an ignition timing control system such as disclosed in the above-mentioned copending U.S. patent application Ser. No. 104,717.

Other and more specific objects of the present invention will become apparent upon a careful consideration of the following detailed description when taken together with the accompanying drawings.

DESCRIPTION OF THE PREFERRED EMBODIMENTS

Figure 1:
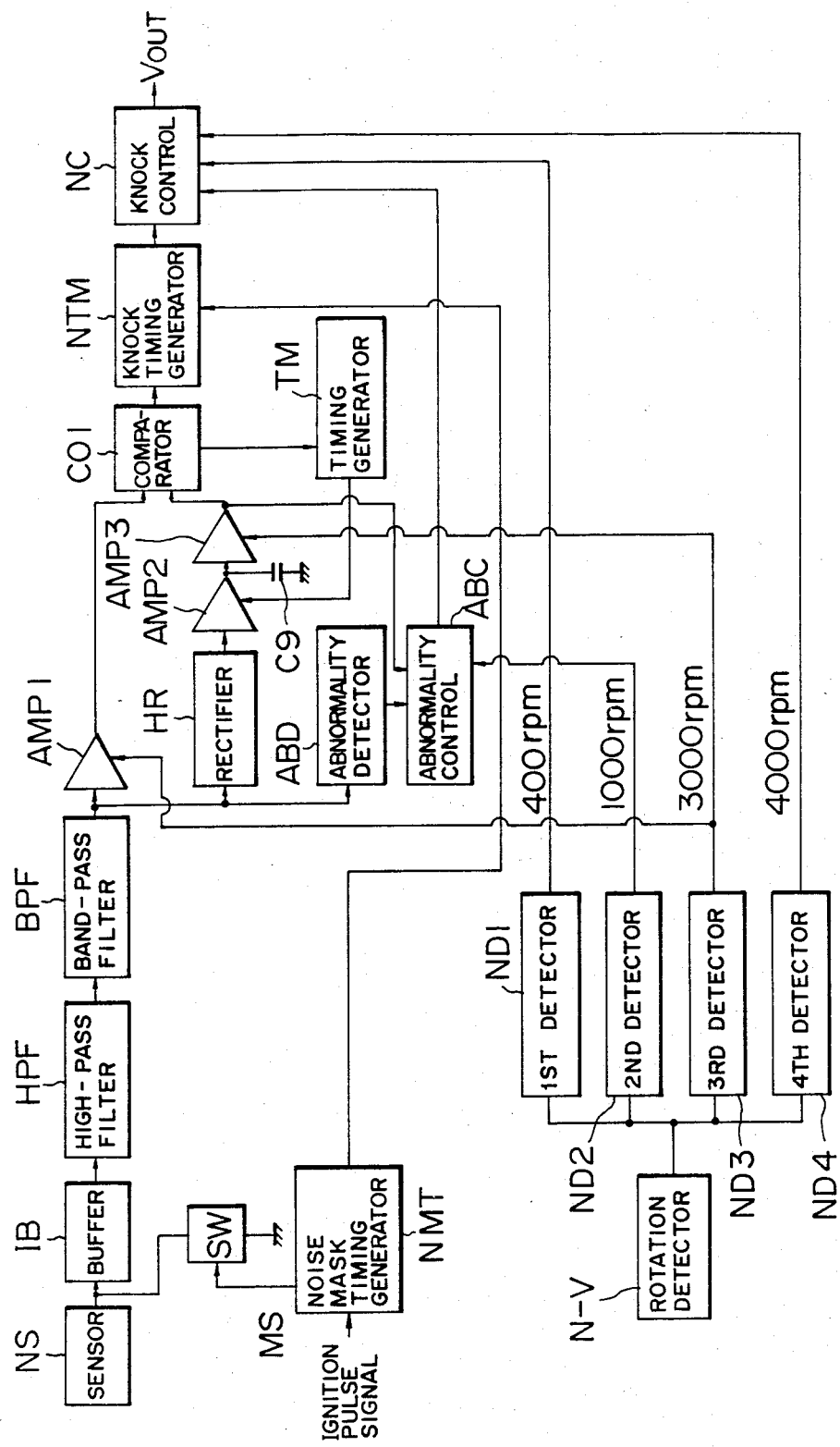
FIG. 1 is a schematic block diagram for explaining the principle of the present invention.

A block diagram for briefly understanding the general configuration of the present invention is shown in FIG. 1. The outline of the present invention will be described with reference to this diagram.

Figure 3:
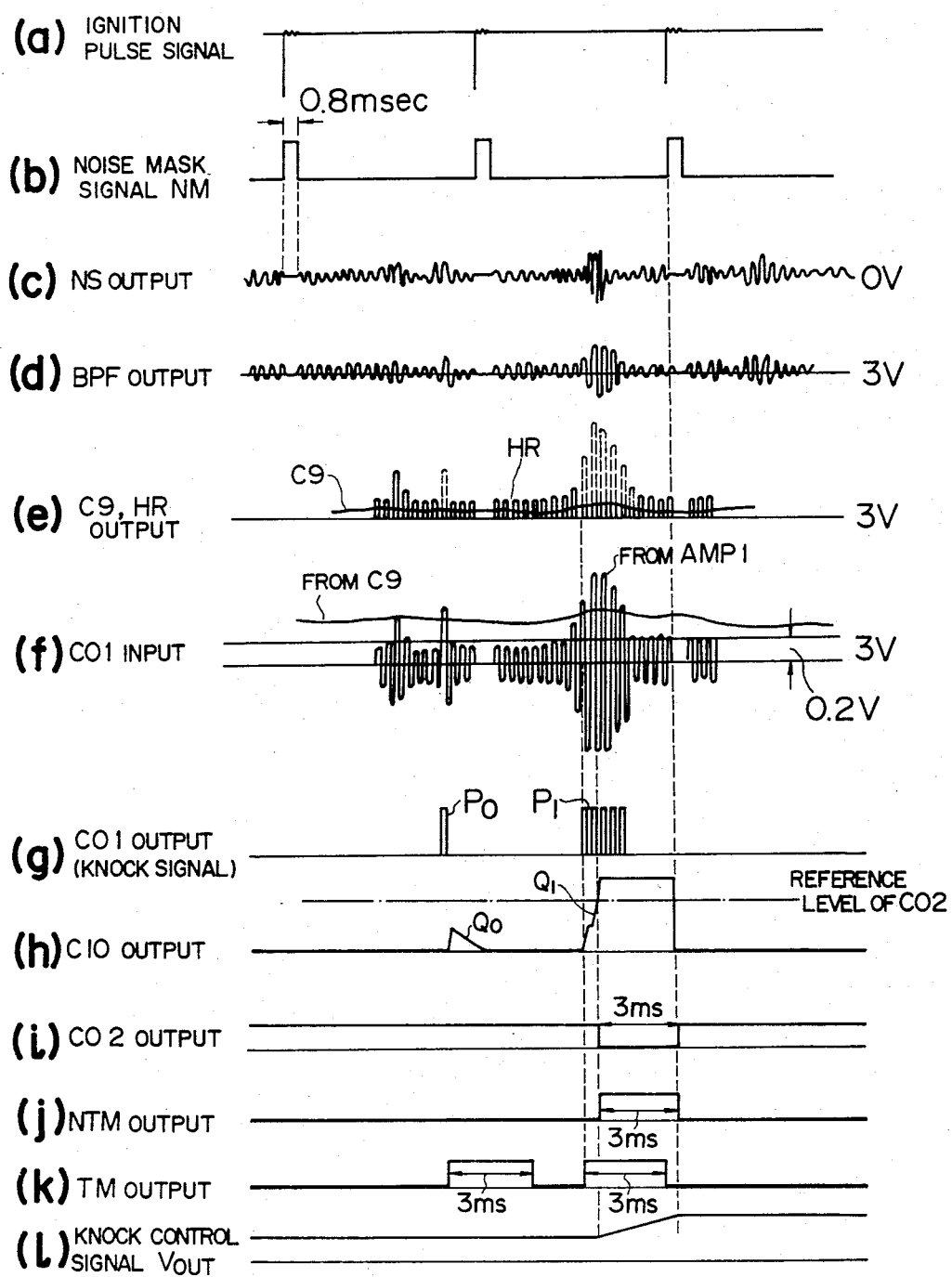
FIG. 3a-3l are a time chart for explaining the operation of the circuit of FIG. 2.

A vibration sensor NS has a function to detect the vibrations of the engine so as to produce an output in the form of an electrical signal (FIG. 3, waveform c). As explained above, the engine vibrations are caused by a knock and other factors. The vibration noise due to the ignition is so large that the signal component of the vibration due to the explosion by ignition must be masked in order to assure accurate detection of the presence of a knock. A noise mask timing generator NMT is for generating a mask signal MS (FIG. 3, waveform b) for this purpose. The output signal of the vibration sensor NS is applied to an input buffer IB. A switching device SW which is triggered by the mask signal MS for nullifying the output signal of the vibration sensor NS is inserted between the vibration sensor NS and the input buffer IM.

The output of the input buffer IB is applied to a high-pass filter HPF. The filter HPF passes the natural frequency of the engine (such as 4 KHz) and higher frequencies.

The output of the high-pass filter HPF (FIG. 3, waveform d) is applied to a band-pass filter BPF. The filter BPF passes the main frequency range of the signal component based on a knock, for example, about 7 KHz.

The output of the band-pass filter BPF is applied to a comparator CO1 through two routes. A first route includes a first amplifiter AMP1 and a first input of the comparator CO1; and a second route includes a half-wave rectifier circuit HR, a second amplifier AMP2, a third amplifier AMP3 and a second input of the comparator CO1 in that order. The first input of the comparator CO1 is supplied with an AC signal (FIG. 3, waveform f) which is obtained by amplifying the output signal of the band-pass filter by the amplifier AMP1. The second input of the comparator CO1, on the other hand, is supplied with a time-varying DC signal which is obtained by half-wave rectifying the output signal of the filter BPF, first, by the half-wave rectifier circuit HR, amplifying then the output of the circuit HR by the amplifier AMP2, averaging out then the output of the amplifier AMP2 by the capacitor C9 (FIG. 3, waveform e) and further amplifying the output of AMP2 by the third amplifier AMP3 (FIG. 3, waveform f). The operation of the amplifiers AMP1, AMP2 and AMP3 and the capacitor C9 will be described in detail later. In short, the output of the third amplifier AMP3 functions as a noise reference signal, and the gains of the amplifiers AMP1 to AMP3 are set in such a manner that this noise reference signal is exceeded only by that instantaneous value of the output signal of the first amplifier AMP1 which includes a signal component due to a knock or a similar vibration. The comparator CO1 produces a pulse signal (FIG. 3, waveform g) only when the instantaneous value of the output signal of the first amplifier AMP1 exceeds the instantaneous value of the third amplifier AMP3. This output signal g indicates the presence of a knock or a similar vibration and will hereinafter be referred to as a knock signal.

The knock signal produced from the comparator CO1 is applied to a knock timing generating circuit NTM. The knock timing generating circuit NTM is not responsive to the knock signal consisting of a single pulse, but responsive to the second pulse of the knock signal in the form of a pulse train containing two or more successive pulses to produce a pulse signal (FIG. 3, waveform j) of a predetermined pulse width (for example, 3 msec).

Figure 4:
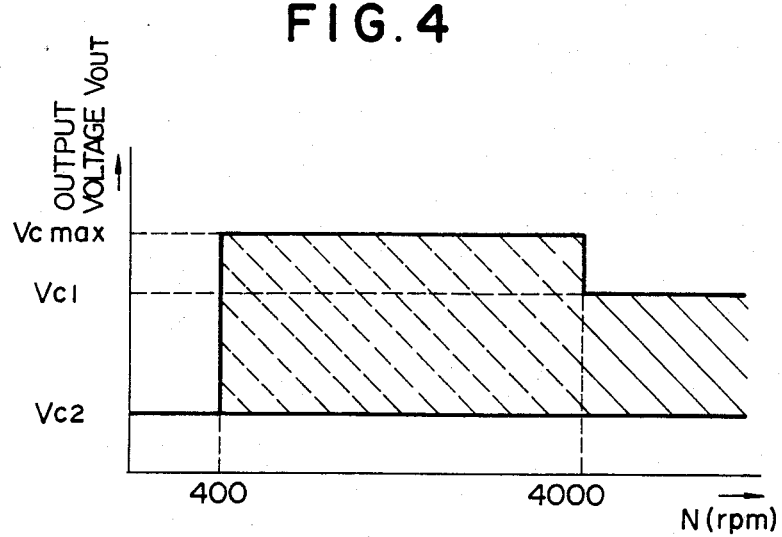
FIG. 4 is a diagram for explaining the relation between the knock control voltage signal according to the present invention and the engine rpm.

The output signal of the knock timing generating circuit NTM is applied to a knock control circuit NC. The knock control circuit NC produces a voltage signal $V_{out}$ (FIG. 3, waveform l) having an amplitude corresponding to an ignition advance or retard angle. This signal $V_{out}$ will hereinafter be referred to as the knock control signal. In the absence of the output signal from the knock timing generating circuit NTM, the amplitude of the knock control signal $V_{out}$ of the knock control circuit NC decreases at a predetermined rate with time (corresponding to the increase in the advance angle). Upon the application of the output pulse signal from the knock timing generating circuit NTM to the knock control circuit NC, however, the knock control signal $V_{out}$ begins to increase in amplitude from the very moment of the signal application, at a predetermined rate with time (corresponding to the decrease in advance angle or increase in retard angle) for the period of time during which the particular pulse signal from the circuit NTM is maintained. After the lapse of this period of time, namely, after extinction of the pulse signal from the circuit NTM, the amplitude of the knock control signal $V_{out}$ decreases again at the same rate as above (FIG. 3, waveform l). The amplitude of the knock control signal $V_{out}$ is not, however, decreased or increased limitlessly but the increase or decrease thereof has a limit depending on the engine rpm. In a mere illustration, the voltage $V_{out}$ takes a constant value of $V_{C2}$ in the engine speed range from 0 to 400 rpm, for example, as shown in FIG. 4. In the range from 400 to 4,000 rpm, for example, the voltage $V_{out}$ takes a value between $V_{C2}$ and $V_{Cmax}$ inclusive. In other words, the value $V_{out}$ changes between the lower limit $V_{C2}$ and the upper limit $V_{Cmax}$. In the range of more than 4,000 rpm, for example, on the other hand, the voltage $V_{out}$ takes a value between $V_{C2}$ and $V_{C1}$ inclusive, that is, it changes between the lower limit $V_{C2}$ and the upper limit $V_{C1}$. An engine speed detecting circuit N-V is provided for detecting the engine speed so as to produce an output in the form of an electrical signal. This rotation detector circuit N-V is provided with a first detector ND1, a second detector ND2, a third detector ND3 and a fourth detector ND4 for detecting the engine speeds of 400 rpm, 1,000 rpm, 3,000 rpm and 4,000 rpm respectively. The outputs of the first detector ND1 and the fourth detector ND4 are applied to the knock control circuit NC thereby to define the three ranges of engine speed including 0 to 400 rpm, 400 to 4,000 rpm, and more than 4,000 rpm.

A timing signal generating circuit TM is provided for producing a timing pulse signal (FIG. 3, waveform k) of a predetermined pulse width (for example, 3 msec) in response to the knock signal (FIG. 3, waveform g) produced from the comparator CO1. This timing pulse signal is produced in response to the first one of the pulses constituting the knock signal in the form of a pulse train, and therefore it is produced even when the knock signal consists of a single pulse. This timing pulse signal is used to nullify the output of the amplifier AMP2 for a predetermined period of (corresponding to its pulse width) time from generation of a knock as mentioned later, thus preventing the noise reference signal produced from the amplifier AMP3 from being increased excessively by the knock.

The output of the band-pass filter BPF is also applied to an abnormality detecting circuit ABD. When the output of the band-pass filter BPF is zero or near to zero, the system comprising the component elements from the vibration sensor NS to the band-pass filter BPF is considered to have shorted or have been disconnected, so that the abnormality detecting circuit ABD produces an output signal and applies it to an abnormality control circuit ABC which inturn applies its output signal to the knock control circuit NC. The knock control circuit NC maintains the output signal $V_{out}$ at $V_{C1}$ regardless of the engine rpm at that time point. In this way, a knock is prevented by setting a maximum retard angle (fail-safe level) at the time of high speed in the case of an abnormality. The output signal of the third amplifier AMP3 is also checked for any abnormality. Knock detection becomes impossible in the event of an abnormally large output of the amplifier AMP3 caused by a fault in the circuits from the half-wave rectifier circuit HR to the output of the third amplifier AMP3. To prevent this inconvenience, the output of the third amplifier AMP3 is applied to the abnormality control circuit ABC so that when this output exceeds a predetermined level, it is decided that an abnormal condition has occurred and the output signal $V_{out}$ is maintained constant at $V_{C1}$.

The abnormality control circuit ABC is inoperative when the output of the rpm detector $ND_2$ is applied to the abnormality control circuit ABC in the engine rpm range from 0 to 1,000 rpm. In other words, even when the abnormality detector circuit ABD detects an abnormal condition and applies its output signal to the abnormality control circuit ABC, the abnormality control circuit ABC does not apply its output signal to the knock control circuit NC. This is for the reason that in the engine speed range at or lower than 1,000 rpm, an output signal is likely to be produced from the abnormality detector circuit ABD even during normal operation, as described later more in detail.

The output of the rpm detector circuit ND3 is related to the first and second inputs of the comparator CO1 in order to prevent a malfunction in knock detection in the range of engine speed exceeding 3,000 rpm, as will be described more in detail later.

Figure 2:
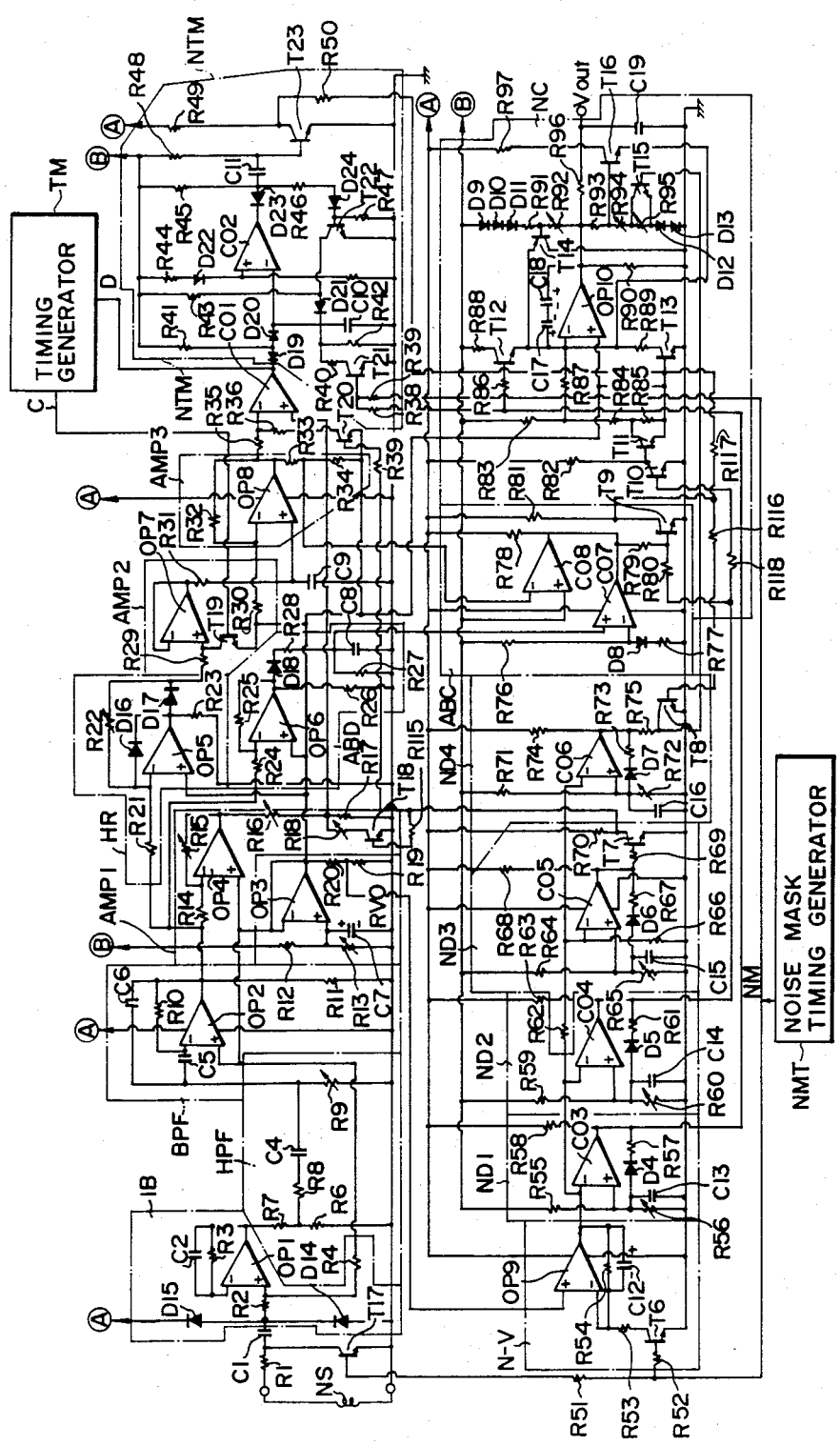
FIG. 2 is a circuit diagram showing a general configuration of the present invention.

A preferred embodiment of the present invention will be described below with reference to FIG. 2.

The output of a vibration sensor NS is applied to an input buffer IB through a resistor R1 and a capacitor C1. The input buffer IB comprises diodes D14, D15, an input resistor R2, an operational amplifier OP1, a feedback resistor R3, a capacitor C2 and a resistor R4. An end of the diode D15 is supplied with an output voltage Ⓐ of a source voltage generating circuit VS (FIG. 8) (which output voltage may be specifically set at a maximum of 10 V, for example, corresponding to the maximum rating of the operational amplifier). The source voltage generating circuit VS generates, in addition to the output voltage Ⓐ, an output voltage Ⓑ (which is specifically set, for example, at 6 V). The circuit configuration and operation of this source voltage generating circuit VS will be described later with reference to FIG. 8. The voltages Ⓐ and Ⓑ are applied to the various circuit elements mentioned below.

A transistor T17 controlled by a mask signal NM is inserted between the junction point of the resistor R1 and the capacitor C1 and the logic common or earth. This transistor T17 corresponds to the switching device SW shown in FIG. 1. The mask signal NM is generated or caused to be a high level (hereinafter referred to as H-level) at the time of masking and is extinguished or is caused to be a low level (hereinafter referred to as L-level) at the time of non-masking. Thus, at the time of generation of the mask signal NM, the transistor T17 is turned on and the vibration sensor output is shorted, thus preventing the output signal of the vibration sensor NS from being applied to the input of the input buffer IB. Thus, the input of the input buffer is masked. When the mask signal NM is at its L-level, namely, it is lacking, the transistor T17 is turned off, and the sensor output is applied to the input buffer IB.

The capacitor C1 plays an important role. When the capacitor C1 were eliminated, an impulse-like input might be applied to the input buffer IB. The application of this impulse might cause an oscillation (attenuative oscillation) of filters BPF and HPF in the subsequent stages (described later). This attenuative oscillation may be prevented by the capacitor C1.

The output of the input buffer IB is coupled with the high-pass filter HPF. This high-pass filter HPF comprises voltage-dividing resistors R6, R7, a resistor R8, a capacitor C4, and a variable resistor R9. The output of the filter HPF is in turn coupled with the band-pass filter BPF of the active filter type comprising a capacitor C5, an operational amplifier OP2, a resistor R10, a capacitor C6, and a resistor R11. As mentioned above, the filter HPF has a function to pass a frequency range including and higher than the main frequency of the signal component based on the natural vibration of the engine (for example, 4 KHz) (hereinafter referred to as the engine natural frequency). The gain at the engine natural frequency is, however, lower than the gain at the range of the main frequency of the signal component based on a knock (hereinafter referred to as the knock frequency). The filter BPF has a function to pass a knock frequency range of, for example, about 7 KHz. For example, the filter HPF attenuates about 6 dB, and the filter BPF attenuates about 18 to 20 dB. As a result, the frequency lower than the engine natural frequency is controlled at an L-level while at the same time maintaining the gain for the engine natural frequency at a level ower than the gain for the knock frequency range. The filter BPF is a kind of Sallen-Key type filter.

If the output of the sensor NS is considered to be an input signal, and the output of the filter BPF is an output signal, the ratio between the input and output is set at 2 or 3. This is in view of the setting of the output of a reference voltage generating circuit RVO. The reference voltage generating circuit RVO comprises voltage-dividing resistors R12, R13 for dividing the power supply Ⓑ, a capacitor C7, an operational amplifier OP3, and output voltage dividing resistors R19, R20. The plus terminal of the operational amplifier OP3 is set at, for example, 3 V. As a result, the output of the reference voltage generating circuit RVO is also converged to 3 V. The output of the reference voltage generating circuit RVO is led to a plus input of the operational amplifiers OP5 and OP6 described later. This circuit configuration causes the output of each of the operational amplifiers to change around the voltage 3 V, the lower limit being not decreased below 0 V. Thus the amplitude of each operational amplifier has a negative side of 3 to 0 V with respect to the reference level of 3 V, and a positive side of more than 3 V, for instance, up to 10 V with respect to the same level. If the amplitude negatively exceeds 0 V, the output of the operational amplifier becomes distorted. The positive side of the amplitude, by contrast, has an ample margin (for instance, a margin of 7 V, in the case of 3 V to 10 V). The input signal, however, changes uniformly both in its positive and negative sides with respect to the reference voltage level of 3 V, and therefore it is necessary to suppress the negative amplitude to be 3 V at maximum. If the input-output ratio is set at 2 to 3 as mentioned above, the output of the filter BPF may change by 20 mV to 3 V (for example) against the change of 10 mV to 1 V (for example) of the output of the vibration sensor NS (as converted into half-wave peak), thus leading to a distortion-free output characteristic faithfully following the input.

The output of the filter BPF is led into three routes. The first route is through a half-wave rectifier HR including a resistor R21, an operational amplifier OP5, diodes D16, D17, and resistors R22, R23. The second route is through an amplifier AMP1 including resistors R14, R15, an operational amplifier OP4, resistors R16, R17, R18 and a transistor T18. The third route is through an abnormality detecting circuit ABD including an operational amplifier OP6, a diode D18, resistors R24, R25, R26, R27, R28, and a capacitor C8. All of these three routes are affected by the fact that the input-output ratio is controlled at 2 to 3 as mentioned above. Specifically, the output of the filter BPF takes a form changing by, for example, 20 mV to 3 V vertically with respect to the reference voltage of 3 V and makes up an input to the three routes.

The abnormality detecting circuit ABD connected to the output of the filter BPF will be described later. The half wave of the output signal of the filter BPF (which is considered to be positive half cycles in this embodiment) is produced as an output signal of the half-wave rectifier circuit HR by the functions of the diodes D16 and D17. This output of the circuit HR is applied to an amplifier circuit AMP2 including an operational amplifier OP7, resistors R29, R30, R31 and a transistor T19. The output of the amplifier AMP2 is applied to the input of the capacitor C9 on the one hand and to the input of an amplifier AMP3 on the other hand. The amplifier AMP3 comprises an operational amplifier OP8, and resistors R32, R33 and R34. The minus terminal of the operational amplifier OP8 is impressed with a constant-voltage (3 V) from the output of the reference voltage generating circuit RVO, through the resistor R30. A comparator CO1 has the minus terminal thereof connected through a resistor R35 with the output of the amplifier AMP3, and the plus terminal thereof connected with the output of the amplifier AMP1.

The above-mentioned route from the output of the filter BPF to the comparator CO1 plays a very important role in the embodiment under consideration, as will be explained in detail below with reference to the time chart of FIG. 3. In this chart, the noise mask signal NM (waveform b) is a pulse signal having a mask width of 0.8 msec, for example, sufficient to mask the vibration due to the ignition pulse signal (waveform a). This masks the output of the vibration sensor and liberates it from the effect of the vibration component of the ignition pulse signal for the period of the mask width. The output of the vibration sensor NS (waveform c) thus obtained is applied through the filter HPF to the filter BPF which generates an output sensitively reflecting the knock as shown by the waveform d. This BPF output, as mentioned above, is an alternating wave signal with the negative portion thereof limited to 0 V with respect to the reference voltage of 3 V. The negative portion of this alternating wave signal is limited to 0 V in order to eliminate the distortion in waveform as explained above.

Through one of the three routes, the output of the filter BPF is half-wave rectified by the half-wave rectifier circuit HR thereby to produce only half-wave portions which are amplified by the amplifier AMP2 and applied to the capacitor C9. This capacitor C9 has a function to follow the average of the output of the amplifier AMP2. The time constant provided by the resistor R31 and the capacitor C9 is thus sufficiently large as compared with the change in the BPF output (frequency). This makes it possible to obtain from the capacitor C9 an output following the average of the change in the output of the amplifier AMP2. The output of the capacitor C9 is amplified by the amplifier AMP3 and applied to the minus terminal of the comparator CO1. The function of the amplifier AMP2 is to further amplify the output of the half-wave rectifier circuit HR to such a degree as not to distort the same. The output signal of the half-wave rectifier circuit HR is positive half cycles of the output of the filter BPF with a peak value of at most about 6 V, which peak value is allowed to be amplified to about 10 V without distortion in the specific example shown above. The function of the amplifier AMP3, on the other hand, is to amplify the output signal of the amplifier AMP2 which is averaged out by the capacitor C9. The output of the amplifier AMP3 applied to the minus inputs of the comparator CO1 as a noise reference is thus increased as much as possible in order to cause the comparator CO1 to be sensitive not to a noise-induced portion in the absence of a knock but to a signal portion in the presence of a knock, of the output signal of the filter BPF applied to the plus input of the comparator CO1 through the amplifier AMP1, thus preventing a malfunction.

The necessity of the amplifier AMP1 will be described. Through another one of the three routes, the output of the filter BPF is amplified by the amplifier AMP1 and applied to the plus input terminal of the comparator CO1. If the output of the filter BPF is directly applied to the plus input terminal of the comparator CO1 without the interposition of the amplifier AMP1 and compared with the output signal of the capacitor C9 applied to the minus input terminal, the original function of the comparator CO1 would not be fully achieved for the reason mentioned below.

The output of the filter BPF is roughly divided into a signal component based on a knock or a similar vibration of large amplitude and a noise signal component based on the other vibrations of small amplitude, the two signal components being superimposed one on the other. The output of the amplifier AMP3, on the other hand, is a signal having an amplitude approximate to the peak value of the noise signal component contained in the output signal of the filter BPF. As a result, when the output of the filter BPF is compared with the output of the amplifier AMP3 at the comparator CO1, not only the peak value of the output signal of the filter BPF exceeds the output level of the amplifier AMP3 in the presence of a knock or a similar vibration but also the peak value of the output signal of the filter BPF may erroneously reach or exceed the output level of the amplifier AMP3 even in the absence of a knock or a similar vibration, thus making it impossible to accurately detect a knock. This is because, in the case where the output of the filter BPF has only the noise signal component, namely in the absence of a knock or a similar vibration, the output signal level of the amplifier AMP3 may be the reference voltage 3 V plus 50 to 100 mV and the positive peak of the output signal of the filter BPF may be also the reference voltage of 3 V plus 50 to 100 mV, for example. The positive peak of the output signal of the filter BPF in the presence of a knock or a similar vibration may be the reference voltage of 3 V plus about 1 V and therefore it can of course be discriminated. Thus, it should be noted that even the noise signal component may cause a malfunction as if a knock or a similar vibration were generated. In order to prevent this trouble, the amplifier AMP1 is provided. The operation of this amplifier AMP1 will be described. The amplification degree of the amplifier AMP1 is such that the positive peak of the output thereof does not exceed 10 V. This is to provide a sufficiently large amplitude of the output signal of the amplifier AMP1 when a knock or a similar vibration occurs. In this case, only the positive half wave of the amplifier AMP1 is compared with the output signal of the amplifier AMP3, namely the noise reference, at the comparator CO1 and therefore no problem is posed even when the negative half wave is distored unless the positive half wave is distorted. (The negative half cycles of the output signal of the amplifier AMP1 shown by the waveform f in FIG. 3 are plotted free of a distortion.) In the case where the output signal of the filter BPF is amplified by the amplifier AMP1, however, the positive peak of the noise signal component contained in the output signal of the amplifier AMP1 is also undesirably increased. As a measure against this inconvenience, dividing resistors R16 and R17 are provided at the output side of the amplifier AMP1 so that the output level of the operational amplifier OP4, namely, the level of the output of the amplifier AMP1 is negatively shifted, so that the output level of the amplifier AMP3 is maintained always higher than the positive peak of the noise signal component of the output of the amplifier AMP1, in the absence of a knock. That is, the reference level of the output of the amplifier AMP1 is downwardly shifted by 0.2 V for example as shown in the waveform f in FIG. 3. In this way, the output of the downwardly shifted level of the amplifier AMP1 is compared with the output of the amplifier AMP3 at the comparator CO1, and therefore the positive peak of the noise signal component of the output of the amplifier AMP1 in the absence of a knock does not exceed the output level of the amplifier AMP3 on the one hand and the positive peak of the output signal of the amplifier AMP1 in the presence of a knock or a similar vibration exceeds the output level of the amplifier AMP3 by a wide margin on the other hand, with the result that the comparator CO1 can perform a correct comparing operation to produce a knock signal. In other words, only when the positive peak of the output signal of the amplifier AMP1 exceeds the output level of the amplifier AMP3, the comparator CO1 produces a knock signal, that is to say, the knock signal is raised to H-level. As seen from above, the knock signal is raised to H-level on the condition that a knock or a similar vibration occurs in the engine and a corresponding output signal is applied to the comparator CO1 from the amplifier AMP1. The knock signal is shown as the waveform g in FIG. 3.

Next, the function of a timing signal generating circuit TM will be described. The knock signal produced from the comparator CO1 (FIG. 3, waveform g) is applied to the timing signal generating circuit TM. The timing signal generating circuit TM is a kind of one-shot multivibrator circuit, which is impressed with a knock signal of a very small width from the comparator CO1 and produces a pulse signal (FIG. 3, waveform k) of a predetermined width of, for example, 3 msec. This pulse signal (k) of the predetermined width turns on the transistor T19. Upon the turning on of the transistor T19, the plus terminal of the operational amplifier OP7 is supplied with the output of the reference voltage generating circuit RVO. The output of this reference voltage generator RVO is 3 V, and therefore the output of the amplifier AMP2 is maintained at the reference level of about 3 V for the predetermined time length of 3 msec, which reference voltage of about 3 V is applied to the capacitor C9. During this time length, the capacitor C9 discharges toward the reference voltage of 3 V, with a peak of the charge voltage reached at the time of generation of the knock signal g from the comparator CO1, if it is a single pulse, or at the time of generation of the first pulse if the knock signal g is a pulse train. This configuration is employed for the reason that as shown in the waveform g of FIG. 3, the knock signal may be generated in the form of either a single pluse such as Po or a pulse train such as P1 including several successive pulses within a short length of time. If all the pulses of the pulse train P1 are applied to the capacitor C9 for the charging thereof, the voltage across the capacitor C9 increases in accordance with the pulses. As a result, the noise reference level of the comparator CO1 increases to such an extent that the discrimination of a knock becomes impossible. In order to prevent this inconvenience, the transistor T19 is provided and turned on by the first pulse of the knock signal pulse train thereby to prevent the overcharge of the capacitor C9 which otherwise might be caused by the immediately following pulses.

The knock signal produced from the comparator CO1 is applied to a knock timing generating circuit NTM. This knock timing generating circuit NTM comprises diodes D19, D20, D21, D22, D23, D24, resistors R38, R39, R40, R41, R42, R43, R44, R45, R46, R47, R48, R49, R50, a comparator CO2, capacitors C10, C11, and transistors T21, T22, T23.

In this knock timing generating circuit NTM, the diode D19 is provided for the purpose of preventing the capacitor C10 from being erroneously charged by the H-level state of the knock signal from the comparator CO1. The capacitor C10 thus plays a very important role in this knock timing generating circuit NTM. The capacitor C11 is used for a one-shot multivibrator. When the knock signal from the comparator CO1 is at its H-level, the diode D19 is turned off and the diode D20 is turned on by the voltage applied thereto through the resistor R41. When the knock signal from the comparator CO1 is at its L-level, on the other hand, the diode D19 is turned on through the resistor R41. Under this condition, the diode D20 is off. In other words, the output of the diode D20 changes with the condition of the knock signal produced from the comparator CO1. Now assume that the output of the comparator CO2 is at its H-level. The diode D23 is off and the diode D24 is on, and the transistor T22 is on. Upon the turning-on of the transistor T22, the anode side of the diode D21 is reduced substantially to zero, and the diode D21 is also kept off. Thus the terminal voltage of the capacitor C10 changes with the output of the diode D20. Assume that the output of the comparator CO2 is reduced from its H-level to L-level. The transistor T22 is turned off, with the result that the current from the source voltage Ⓑ flows to the capacitor C10 through the resistor R43 and the diode D21, so that the capacitor C10 is charged. In this way, the voltage across the capacitor C10 sharply increases by the decrease of the output of the comparator CO2 from its H-level to L-level, thus holding the output of the comparator CO2 at its L-level.

Now, let's discuss the charging conditions of the capacitor C10 on the basis of the above-mentioned fact. Assume that the output of the comparator CO2 is at its H-level and that the transistor T22 is on and the diode D21 is off. If the output knock signal pulse Po (FIG. 3) of the comparator CO1 is generated under this condition, the diode D19 is turned off and the capacitor C10 is charged through the resistor R41 and the diode D20 from the source voltage Ⓑ. Since the knock signal in this case is a single pulse, however, the charging of the capacitor C10 immediately stops and the capacitor C10 discharges through the resistor R42. The change in the charge level of the capacitor C10 is shown by Qo in the waveform h of FIG. 3. Specifically, in response to the single pulse Po of the knock signal g, the output of the capacitor C10 fails to reach the input level of the plus terminal of the comparator CO2, namely, the reference level thereof. Thus the output of the comparator CO2 does not change but remains at its H-level. In response to a pulse train containing successive pulses such as P1, on the other hand, the amount of charge to the capacitor C10 increases. For example, assuming that two successive pulses cause the output level of the capacitor C10 to reach the reference level of the comparator CO2, the output of the comparator CO2 changes from its H-level to L-level at the very instant of the reaching. Once the output of the comparator CO2 changes to its L-level, the transistor T22 is turned off and the capacitor C10 is rapidly charged until the charge level thereof reaches a predetermined value as shown by $Q_1$ in the waveform h of FIG. 3, .thus holding the comparator CO2 at its L-level. If the output of the comparator CO2 is to change from its L-level to H-level, the capacitor C10 is required to be discharged. This will be described later.

The output condition of the comparator CO2 is transmitted through the diode D23 and the capacitor C11 to the transistor T23. The resistors R45, R46, R47, R48, R49, the capacitor C11 and the transistor T23 make up a one-shot multivibrator circuit. During the period when the output of the comparator CO2 is at its H-level, the diode D23 is turned off and the capacitor C11 is charged through the resistor R48, thus turning on the transistor T23. The output level of the transistor T23 and hence the output level of the knock timing generating circuit NTM is zero or at its L-level. When the output of the comparator CO2 changes to its L-level, the diode D23 is turned on and the capacitor C11 is discharged through the diode D23, so that the transistor T23 is turned off and the output thereof and hence the output level of the knock timing generating circuit NTM changes to its H-level. This condition is shown by the waveform j in FIG. 3. The transistor T23 is kept off for a substantially fixed period (for example, 3 msec) until the next discharge of the capacitor C10. As a result, the output of the knock timing generating circuit NTM is also kept at its H-level for a fixed period of time. The manner in which the capacitor C10 is discharged and the transistor T23 is turned on will be described below.

The charge voltage of the capacitor C10 is rapidly discharged to be reset by the turning on of the transistor T21. The discharge of the capacitor C10 restores the output of the comparator CO2 to its H-level, turns off the diode 23, and turns on the transistor T23 again, so that the output thereof, namely, the output level of the knock timing generating circuit NTM is returned to its L-level. The transistor T21 is adapted to be turned on when the engine is running at a low speed of 400 rpm or less, for example, or when the noise mask signal NM is generated. The former condition is attained by the comparator CO3 the output of which is raised to its H-level at the engine running speed of 400 rpm or less, for example, whereby the transistor T21 is turned on via the resistor R38. The latter condition is realized by the output NM of the noise mask generating circuit NMT, which turns on the transistor T21 through the resistor R39. The significane of these two conditions will be discussed. At the engine running speed of 400 rpm or less, for example, the engine is being started and considered to be free of any knock. The manner in which the charge level of the capacitor C10 is reset by the noise mask signal NM will be described. In each period of the noise mask signal NM, namely, each ignition cycle, it is considered only one knock signal might be generated (FIG. 3, waveform g,). Once a single pulse Po or the first pulse of a pulse train P1 making up the knock signal is detected, therefore, another knock signal is not applied unitl the application of the next noise mask signal NM. For this reason, the circuits are so configured that the capacitor C10 is charged by the detection of the first pulse of the knock signal and the charged condition is maintained until being reset by the arrival of the next noise mask signal NM. The above-mentioned fact will be briefly explained in relation to the knock signal. When the output of the comparator CO2 is at its H-level, i.e., when the output of the knock timing generating circuit NTM is at its L-level, it indicates the absence of a knock signal comprising a pulse train. When the output of the comparator CO2 is changed to its L-level or when the output of the knock timing generating circuit NTM changes to its H-level, on the other hand, it indicates generation of a knock signal comprising a pulse train. Once the output of the comparator CO2 changes to its H-level, this condition is held for a substantially fixed period of time. Take note of the fact that by this configuration, the knock signal from the comparator CO1 is detected by the comparator CO2 not in the form of a single pulse Po but only in the form of a pulse train such as P1.

The output of the transistor T23, that is, the output of the knock timing generating circuit NTM is applied via the resistor R50 to the knock control circuit NC, as will be described later in detail.

Next, the engine rpm detection system will be described. The rpm-to-voltage converter N-V comprises resistors R52, R53, R54, a capacitor C12, an operational amplifier OP9 and a transistor T6. The transistor T6 is impressed with the noise mask signal NM through the resistor R52. As a result, the transistor T6 is turned on only when the noise mask signal NM is produced or at its H-level; and is turned off when the noise mask signal NM is not produced or at its L-level. Only when the transistor T6 is on, the capacitor C12 is charged and it is discharged through the resistor R54 when the transistor T6 is off. The rpm of the engine corresponds to the reciprocal of the period of the noise mask signal NM. Accordingly, with the increase in the engine rpm, the period of the noise mask signal NM is reduced and the discharge time length is also shortened, so that a voltage depending on the magnitude of the engine rpm is generated at the output of the operational amplifier OP9. The amplifier OP9 is arranged such that the output voltage thereof is not saturated at a high engine speed. For this purpose, the reference voltage is set at a small value such as 1.5 V.

The output of the rpm-to-voltage converter N-V is applied to the rpm detectors ND1, ND2, ND3 and ND4. The rpm detector ND1 is provided for detecting the speed of 400 rpm and comprises resistors R55, R56, R57, R58, a capacitor C13, a diode D4, and a comparator CO3. The comparator CO3 is set to produce an output of H-level in response to the engine speed of 400 rpm or less and an output of L-level at the engine speed of more than 400 rpm. The detector ND2 is provided for detecting the engine speed of 1,000 rpm and comprises resistors R59, R60, R61, R63, a capacitor C14, a diode D5 and a comparator CO4. This detector ND2 is so construced that the comparator CO4 produces an output of H-level at the engine speed of 1,000 rpm or less and an output of L-level at the engine speed of more than 1,000 rpm.

The detector ND3 is for detecting the engine speed of 3,000 rpm and comprises resistors R62, R64, R65, R66, R67, R68, R69, R70, a capacitor C15, a diode D6, a comparator CO5, and a transistor T7. The comparator CO5 of this detector ND3 similarly produces an output of H-level at the engine speed of 3,000 rpm or less and an output of L-level at the engine speed of more than 3,000 rpm.

The detector ND4 is for detecting the engine speed of 4,000 rpm and comprises resistors R71, R72, R73, R74, R75, a capacitor C16, a diode D7, a comparator CO6 and a transistor T8. This detector ND4 is so constructed as to produce an output of H-level at the engine speed of 4,000 rpm or less and an output of L-level at the engine speed of more than 4,000 rpm.

The rpm detectors ND1 to ND4 are used for the purpose of various controls as mentioned below.

The output of the rpm detector ND1 is used to control the transistor T21 for resetting the capacitor C10 via the resistor R38, as explained already. The output of the detector ND1 is further applied to the knock control circuit NC thereby to control the transistor T12 through the resistor R86. The control of the transistor T12 will be described later.

The output of the rpm detector ND2 is applied to the abnormality control circuit ABC to control the transistor T9 through the resistor R80 on the one hand and control the transistor T10 through the resistor R118 at the same time. This control will also be described later.

The output of the rpm detector ND3 turns on the transistor T18 of the abnormality detector circuit ABD through the resistor R115, and also the transistor T20 through the resistor R39, only when the transistor T7 is on, that is, the engine speed is more than 3,000 rpm. As a result, the signal input level to the plus terminal of the comparator CO1 is reduced to a level lower than that for 3,000 rpm or less, while at the same time bringing the input level of the minus terminal of the comparator CO1 to the reference voltage level through the resistor R36. This control is effected in order to prevent a malfunction at the engine speed of more than 3,000 rpm where the background or noise reference level is higher than a set level. Specifically, when the engine speed is more than 3,000 rpm, the gain of the background or noise reference level is set at a lower level than when it is 3,000 rpm or less. This means that the gain of the signal output is reduced for the engine speed of more than 3,000 rpm.

The output of the rpm detector ND4 is used to control the transistor T15 of the knock control circuit NC through the transistor T8. The transistor T8 is controlled by the output of the circuit NTM through a resistor R116. In the process, it is important to discriminate the on-off state of the transistor T9. The above-mentioned control will specifically be described later.

The abnormality control circuit ABC has a function to detect the abnormality in the vibration detection system as well as the abnormality in the signal processing circuits such as filters and amplifiers so as to take a special action upon the detection of an abnormality. The abnormalities of the vibration detecting system include a zero output state caused by disconnection or shorting. The abnormalities in the processing circuits include generation of an overvoltage higher than necessary. The former is detected by the abnormality detector circuit ABD, and the latter by the abnormality control circuit ABC checking the output of the amplifier AMP3 in the final stage of the background detection system. The abnormality control circuit ABC comprises resistors R76, R77, R78, R79, R80, a diode D8, a transistor T9 and comparators CO7, CO8. The output of the abnormality detector circuit ABD is applied to the plus terminal of the comparator CO7. Under an abnormal condition where the vibration sensor NS is shorted so that the output thereof is reduced to zero voltage and the output of the abnormality detector circuit is reduced, for instance, the output of the comparator CO7 changes to its L-level. The output of the amplifier AMP3, on the other hand, is applied to the minus terminal of the comparator CO8. In the case where the output level of the amplifier AMP3 is abnormally high, the output of the comparator CO8 is reduced to its L-level. On the condition that the output of either the comparator CO7 or CO8 changes to its L-level, the transistor T9 is turned off thereby to detect the generation of the abnormality. When an abnormality has been detected, the output of the knock control circuit NC described later is rendered equal to the level for high-speed engine operation. The meaning of this output level will be described later. When the engine speed is 1,000 rpm or less, by the way, the output of comparator CO4 of the rpm detector ND2 is at its H-level and therefore the transistor T9 is forcibly turned on through the resistor R80, thus preventing the abnormality detector circuit ABD from being actuated.

Figure 5:
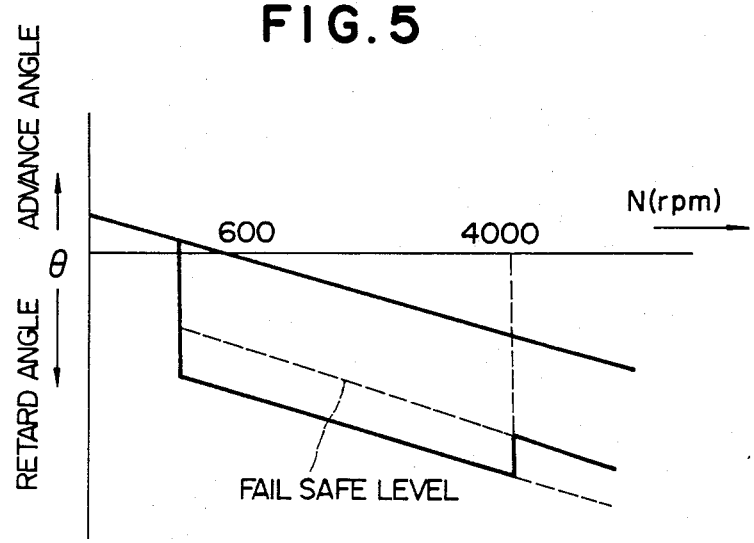
FIG. 5 is a diagram for explaining the relation between the knock control voltage signal shown in FIG. 4 and the ignition advance or retard.

The knock control circuit NC generates a knock control output voltage signal $V_{out}$ in accordance with the characteristic shown in FIG. 4 depending on the engine rpm N. As shown illustratively in FIG. 4, the output voltage $V_{out}$ is maintained at a constant value $V_{c2}$ at the engine speed N of 400 rpm or less. In the middle speed range from 400 rpm to 4,000 rpm the output voltage $V_{out}$ may change in the range between the upper limit $V_{cmax}$ and the lower limit $V_{c2}$. In the high-speed range more than 4,000 rpm, the output voltage $V_{out}$ may change in the range between the upper limit $V_{c1}$ and the lower limit $V_{c2}$. The characteristic of FIG. 4 corresponds to the retard angle characteristic of the ignition apparatus. FIG. 5 shows the retard angle characteristic of the ignition apparatus. The ordinate represents an advance and a retard angle $\theta$, and the abscissa represents the engine rpm N. The characteristic of FIG. 4 is one for the electrical circuit to obtain such a retard angle characteristic as shown in FIG. 5. As seen from the drawing, the amplitude of the knock control voltage $V_{out}$ is proportional to the ignition advance angle and inversely proportional to the retard angle for the same engine rpm speed N. It should be remembered, however, that if different engine rpm are involved, the same amplitude of the knock control voltage $V_{out}$ is not accompanied by the same advance or retard angle.

The knock control circuit NC includes resistors R116, R117, R118, R82, R83, R84, R85, R86, R87, R88, R89, R90, R91, R92, R93, R94, R95, R96, R97, transistors T10, T11, T12, T13, T14, T15, T16, an operational amplifier OP10, capacitors C17, C18, C19, and diodes D9, D10, D11, D12, D13. The capacitors C17, C18 are for a Miller integrator. The resistor R87 has a high resistance value which is set as a means for supplying a constant current to the negative terminal of the operational amplifier OP10 from the junction point between the resistors R83 and R84 by the voltage divided by the resistors R83 and R84 (R85). The diodes D9 to D13 are inserted for temperature compensation.

In this knock control circuit NC, the minimum clamp voltage $V_{c2}$ is determined mainly by the transistor T14 and the resistors R91, R92. Specifically, the resistors R91 and R92 are set in such a manner that the transistor T14 is turned on when the output $V_{out}$ reaches $V_{c2}$. Under this condition, the minimum voltage $V_{c2}$ is preferably about 1.7 V, for example, as obtained in the manner shown below.

$$(B - V_{out} - nV_{BE}) \times \frac{R92}{R92 + R91} + V_{out} = \frac{B}{2} - V_{BE} \quad (1)$$

where $V_{BE}$ is the voltage across the base and emitter of the transistor, $V_F$ is the forward voltage drop of the diode, and n is the number of the diodes, and therefore $nV_F$ ($V_F \approx V_{BE} \approx 0.7$ V) is the total threshold value due to the diodes D9, D10 and D11. Equation (1) is rewritten as $$\frac{R91}{R91 + R92} V_{out} = \left(\frac{1}{2} - \frac{R92}{R91 + R92}\right) B + \frac{nR92}{R91 + R92} V_F - V_{BE} \quad (2)$$

If $V_{c2}$ is substituted into $V_{out}$, equation (2) is given as $$V_{c2} = \left(1 + \frac{R92}{R91}\right) \left\{ \left(\frac{1}{2} - \frac{R92}{R91 + R92}\right) B + \frac{nR92 V_F}{R91 + R92} - V_{BE} \right\} \quad (3)$$

$$= \left(1 + \frac{R92}{R91}\right) \left\{ \left(\frac{1}{2} - \frac{1}{1 + \frac{R92}{R91}}\right) B + \frac{nV_F}{1 + \frac{1}{\frac{R92}{R91}}} - V_{BE} \right\}$$

The number n of the diodes D9 to D11 is 3. If the ratio R92/R91 is selected to be 0.37, the value of $V_{c2}$ becomes 1.71 V.

The maximum clamp voltage $V_{cmax}$, on the other hand, which is preferably about 5.8 V, is determined by the resistors R93, R94 and the transistor T16 according to the equation below.

$$(V_{out} - nV_F) \frac{R94}{R94 + R93} + nV_F = \frac{B}{2} + V_{BE} \quad (4)$$

where $V_F$ is the threshold value of the diodes D12 and D13. If $V_{out} = V_{cmax}$, $$V_{cmax} = \left(1 + \frac{R93}{R94}\right) \left(\frac{B}{2} + V_{BE} - nV_F\right) + nV_F \quad (5)$$

From the viewpoint of the temperature coefficient, $$\frac{\partial V_{out}}{\partial T} \approx \left(1 + \frac{R93}{R94}\right)(1 - n)\frac{\partial V_F}{\partial T} + \frac{\partial V_F}{\partial T} \quad (6)$$

Thus, $$n \approx 1 + \frac{R94}{R93} \quad (7)$$

The number 2 of the diodes D12 and D13 is applied, and then R93/R94=0.92 is obtained. Thus, $V_{cmax}$=5.82 V.

At the engine revolutional speed of more than 4,000 rpm, the transistor T15 is turned off as if the resistor R94 is connected in series with the resistor R95. $V_{c1}$ is set under this condition. At the engine speed N of more than 1,000 rpm the transistor T11 is turned on, while at the engine speed of 1,000 rpm or less, the transistor T11 is turned off. In other words, at the engine speed of more than 1,000 rpm the resistor R84 sets a divided voltage, and at 1,000 rpm or less the series resistance of the resistors R84 and R85 sets the divided voltage. This divided voltage is used for determining the constant current value through the resistor R87.

This configuration is such that in the engine low speed range of, for example, 400 rpm or less, the knock control signal $V_{out}$ produced from the knock control circuit NC takes a constant value of $V_{c2}$. In the middle and high speed ranges where the engine speed exceeds 400 rpm, the knock control signal $V_{out}$ which changes in such a manner as shown by the waveform l in FIG. 3 is obtained. The amplitude of this knock control signal $V_{out}$ corresponds to the magnitude of the advance angle of ignition, so that with the decrease in amplitude, the ignition angle and hence the ignition timing is advanced, whereas with the increase in amplitude, the ignition angle and hence the ignition timing is retarded. In a specific example, in the absence of a knock, the amplitude of the knock control signal $V_{out}$ decreases at a predetermined rate with time as shown in the waveform l in FIG. 3. When a knock occurs, on the contrary, the amplitude of the knock control signal $V_{out}$ increases by a certain amount for the predetermined time period (3 msec in this example) which is determined in response to the generation of the output pulses of the knock timing generating circuit NTM as mentioned above. Thereafter the amplitude of the signal $V_{out}$ decreases again at the same rate as mentioned above. This change in amplitude of the signal $V_{out}$ does not of course continue infinitely, but is subject to the limitation mentioned above. Specifically, in the middle speed range from 400 to 4,000 rpm, the condition $V_{c2} \leq V_{out} \leq = V_{cmax}$ must be satisfied; and in the high speed range of 4,000 rpm or higher, the condition $V_{c2} \leq V_{out} \leq V_{c1}$ is required to be met. The rate at which the amplitude of the knock control signal increases in the presence of a knock signal is set about 10 to 30 times the rate of decrease of the amplitude in the absence of a knock, in terms of time. As a specific example, the rate of amplitude decrease in the absence of a knock is determined in such a manner that the ignition advance angle increases by about 3 degrees/sec for the engine speed range of 1,000 rpm or less, and by about 1 degree/sec for the engine speed of more than 1,000 rpm. The rate of amplitude increase of the knock control signal $V_{out}$ in the presence of a knock, on the otherhand, is determined such that the ignition advance angle decreases or retards by about 1.5 degrees/cycle in crank angle.

The abnormality control circuit ABC operates in such a manner that the transistor T9 thereof is turned off when an abnormality is detected, namely, when the output of either the comparators CO7 and CO8 is reduced to its L-level. As a result, the transistors T8 and T13 are turned on, and the knock control signal $V_{out}$ is maintained constant at $V_{cl}$. Thus, under an abnormal condition, the retard angle is set at the maximum value $V_{cl}$ for the high-speed revolutions. This provides a measure against a knock caused at the time of an abnormality. Of course, under normal conditions, a knock control signal $V_{out}$ is produced according to the characteristic of FIG. 4 on the basis of the output of the circuit NTM.

The knock control signal $V_{out}$ thus produced is applied, for example, to the retard control circuit for the ignition timing control system as disclosed in the above-mentioned copending U.S. application Ser. No. 104,717 thereby to control the retarding.

Figure 6:
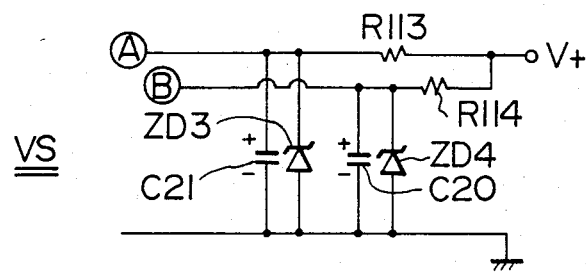
FIG. 6 is a circuit diagram showing a specific configuration of a source voltage generating circuit.

An embodiment of the source voltage supplying circuit VS is shown in FIG. 6. This circuit VS comprises resistors R113, R114, capacitors C21, C20, and zener diodes ZD3, ZD4. The input voltage Vt is supplied from a battery, a generator or a regulator and the output voltage at the terminal Ⓐ is set at 10 V (max) by the zener diode ZD3. Further, the output voltage at the terminal Ⓑ is set at 6 V by the zener diode ZD4. The capacitors C21 and C20 are both used for voltage stabilization.

Figure 7:
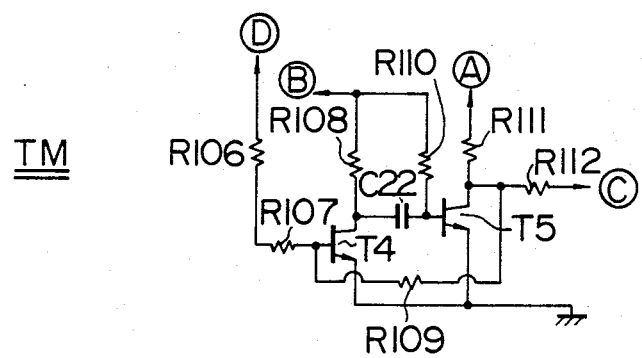
FIG. 7 is a circuit diagram showing a specific configuration of a timing generating circuit.

An embodiment of the timing circuit TM is shown in FIG. 7. The terminal D is connected to the output of the comparator CO1 shown in FIG. 2 and provides an input to the circuit TM. The terminal C provides an output terminal of the circuit TM and is connected to the base terminal of the transistor T19 in FIG. 2 for control of the transistor T19. In operation, this circuit makes up a kind of one-shot multivibrator. This circuit comprises resistors R106, R107, R108, R109, R110, R111, R112, a capacitor C22, and transistors T4, T5. The transistor T4 is turned on in response to the generation of a knock signal produced from the comparator CO1 and is turned off in response to the extinction of the same knock signal. As a result, the voltage of the capacitor C22 changes, so that an output signal with a predetermined width (3 msec) is produced at the terminal C at the time when a knock-free condition changes to a knock condition. When the output at the terminal C is at an H-level, the transistor T19 is turned on.

Figure 8:
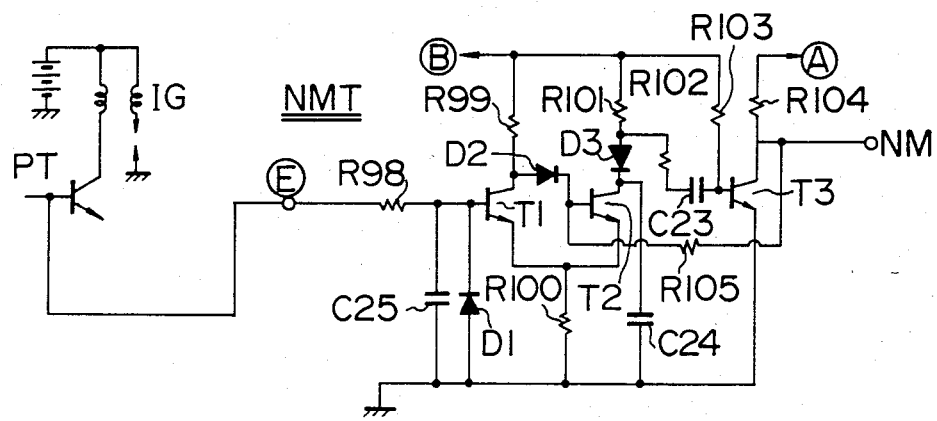
FIG. 8 is a circuit diagram showing a specific configuration of a noise mask timing generating circuit.

An embodiment of the noise mask timing generating circuit NMT is shown in FIG. 8. This circuit NMT comprises resistors R98, R99, R100, R101, R102, R103, R104, R105, capacitors C23, C24, C25, diodes D1, D2, D3 and transistors T1, T2, T3. The input terminal E of this circuit NMT is supplied with an ignition pulse signal which is to be applied to the base of the transistor PT for generating a high voltage at the primary winding of the ignition coil IG in the ignition apparatus. The diode D1 has a function to protect the transistor T1 by relieving the same of a negative surge current flowing through the resistor R98. The capacitor C25 is for eliminating external noises (high frequency components) carried on the power line. A feature of the present embodiment lies in that the resistor R102 is connected in series with the capacitor C23 for providing the output with a retard. This eliminates a chatter for the reason mentioned below. The base voltage of the power transistor PT carries, at the time of rise thereof, a chatter providing a noise of about 50 μsec (which is essentially caused by the vibration at the time of the rise of the primary current at the output of the power transistor PT, which in turn is due to the rise of the base voltage). This chatter is removed by the retarding characteristic mentioned above. The basic function of the above-mentioned circuit is that of a one-shot multivibrator with the capacitor C23 as a main element, and the noise mask signal NM with a width of about 0.8 msec is generated at the time of the fall of the base current of the power transistor PT which flows through the resistor R98. In other words, at the time of a fall of the base current, an ignition signal is generated and the excessive vibration noise occurring at this time is masked over a width of 0.8 msec. The figure of 0.8 msec is set to cover the time length of 0.5 msec of the vibration noise. This masking time, therefore, may be changed as desired depending on the engine capacity or the conditions of the spark plug.

We claim:

1. An ignition retard angle control for use in an internal combustion engine, comprising:
   first means for detecting vibrations of the engine to produce an output in the form of an electrical signal;
   second means for discriminating part of the output signal of said first means in a characteristic frequency range in which a knock-induced vibration component appears remarkably when a knock is generated;

third means for amplifying an output signal of said second means at a first amplification degree;

fourth means for rectifying the output signal of said second means;

fifth means for averaging out an output signal of said fourth means;

sixth means for amplifying an output signal of said fifth means at a second amplification degree, said first and second amplification degrees being determined in such a manner that the peak of the instantaneous values of the amplitude of the output signal of said third means exceeds the instantaneous value of the amplitude of the output signal of said sixth means only in the presence of a knock;

seventh means for comparing the output signals of said third and sixth means with each other to produce a knock signal showing the presence of a knock when the instantaneous value of the output signal of said third means exceeds that of the output signal of said sixth means; and eighth means for generating a voltage signal having an amplitude corresponding to an ignition advance angle determined by the number of revolutions per unit time of the engine, the amplitude of said voltage signal being changed in a manner to retard the ignition advance angle by a predetermined amount in response to the generation of the knock signal.

2. An ignition retard angle control apparatus according to claim 1, further comprising ninth means for nullifying the output signal of said first means during a first predetermined period from the generation of an engine ignition signal in response to said engine ignition signal.

3. An ignition retard angle control apparatus according to claim 2, wherein said first predetermined period is sufficiently long to cover a period during which the explosion of an air-mixed fuel gas of the engine has an effect on the engine vibrations.

4. An ignition retard angle control apparatus according to claim 1, wherein said second means includes a high-pass filter for passing signals in a frequency range including and higher than a frequency related to the natural frequency of said engine in the output signal of said first means, and a band-pass filter for passing signals of and around said characteristic frequency in response to the output signal from said high-pass filter.

5. An ignition retard angle control apparatus according to claim 1, further comprising ninth means for detecting the number of revolutions per unit time of the engine, said eighth means determining the amplitude of said voltage signal in accordance with the output signal of said ninth means and said knock signal.

6. An ignition retard angle control apparatus according to claim 5, wherein the amplitude of the output voltage signal of said eighth means is controlled such that it is fixedly maintained at a first amplitude value representing a first ignition timing when the output of said ninth means indicates that the engine is in a low speed range, wherein the amplitude of the output voltage signal of said eighth means changes normally with time at a fixed rate from said first amplitude value toward a second amplitude value representing a second ignition timing advanced by a predetermined amount from said first ignition timing when a knock is not generated and changes when a knock is generated to go back from the instantaneous amplitude value at the time point where the knock is generated toward said first amplitude value by a predetermined amount in response to said knock signal and thereafter changes again with time toward said second amplitude value at said predetermined rate, when the output of said ninth means indicates that the engine is in a middle speed range, and wherein the amplitude of the output voltage signal of said eighth means changes in a manner similar to that for said middle speed range, between said first amplitude value and a third amplitude value positioned intermediate said first and second amplitude values when the output of said ninth means indicates that the engine is in a high speed range.

7. An ignition retard angle control apparatus according to claim 6, further comprising tenth means connected to the outputs of said second and sixth means for generating an output signal upon detection of an abnormality in selected one of the output signals of said second and sixth means, the amplitude of the output voltage signal of said eighth means in said middle speed range being changed in response to the output signal of said tenth means in the same manner as in said high speed range.

8. An ignition retard angle control apparatus according to claim 7, further comprising eleventh means for nullifying the output of said tenth means when the engine speed is at a value lower than a predetermined value in said middle speed range.

9. An ignition retard angle control apparatus according to claim 1, wherein said seventh means does not produce its output signal when said knock signal consists of a single pulse while it produces its output signal when said knock signal consits of a pulse train containing at least two pulses.

10. An ignition retard angle control apparatus according to claim 1, 2, 3, 4, 5, 6, 7, 8 or 9, further comprising timing signal generating means for generating an output signal for nullifying the output of said fourth means for a predetermined period of time in response to said knock signal.

11. An ignition retard angle control apparatus according to claim 10, further comprising reference potential generating means having a predetermined positive reference potential, said reference potential providing a reference level from which the output signals of said second means and said third means change in positive and negative directions alternately to an extent not to take a negative value, said fourth means half-wave rectifying the output signal of said second means to produce the positive half cycles thereof with respect to said reference level, said seventh means comparing the output signal of said sixth means with the positive half cycles of the output of said third means with respect to said reference level.

12. An ignition retard angle control apparatus according to claim 11, further comprising level-down means for reducing the output of said third means by a predetermined amount and reducing the output signal of said sixth means to said reference level when the number of engine revolutions per unit time exceeds a predetermined value.

13. An ignition retard angle control apparatus according to claim 12, wherein said third means includes a first differential amplifier having a plus input impressed with said reference potential and a minus input impressed with the output signal of said second means, said fourth means including a second differential amplifier having a plus input impressed with said reference potential and a minus input impressed with an output signal of said first differential amplifier, said fifth means including a third differential amplifier having a plus input impressed with an output signal of said second differential amplifier as well as said reference potential through first switching means and a minus input directly connected with an output thereof, said fifth means further including a capacitor connected to the output of said third differential amplifier and charged by an output signal therefrom, said sixth means including a fourth differential amplifier having a plus input impressed with a charged potential of said capacitor and a minus input impressed with said reference potential, said seventh means including a comparator having a plus input impressed with the output signal of said first differential amplifier and a minus input impressed with the output signal of said fourth differential amplifier, said comparator producing said knock signal, said level-down means including voltage-dividing resistor means for dividing an output voltage of said first differential amplifier and second and third switching means actuated when the number of engine revolutions exceeds said predetermined value, said second switching means being connected to said voltage-dividing resistor means in a manner so as to, upon actuation thereof, change the voltage-dividing ratio of said voltage-dividing resistor means, said third switching means being inserted between said reference potential generator means and the minus input of said comparator in a manner so as to, upon actuation thereof, connect said reference potential to said minus input of said comparator, said timing signal generating means generating a timing signal kept on for said predetermined period of time, said first switching means being turned off by said timing signal.

14. An ignition retard angle control apparatus for an internal combustion engine, comprising:
  first means for detecting engine vibrations to produce an output in the form of an electrical signal;
  second means for discriminating part of the output of said first means in characteristic frequency range in which a knock-induced vibration component appears remarkably when a knock is generated;
  third means for receiving an output signal of said second means and for amplifying the same at a first amplification degree;
  fourth means for receiving the output signal of said second means for averaging out the same signal and for amplifying the same signal at a second amplification degree, said first and second amplification degrees being determined in such a manner that an output of said third means exceeds the output of said fourth means only in the presence of a knock;
  fifth means for comparing the outputs of said third and fourth means with each other so as to produce a knock signal indicating the presence of a knock only when the output of said third means exceeds that of said fourth means;
  sixth means for detecting the number of revolutions of the engine per unit time;
  seventh means for producing a voltage signal for determining an engine ignition timing in response to an output signal of said sixth means and said knock signal, wherein the amplitude of said voltage signal corresponds to an ignition advance angle for determining the ignition timing and changes with time in a manner so as to increase the ignition advance angle at a predetermined rate and as to retard the ignition advance angle at the time point of generation of the knock signal by a predetermined amount when said knock signal is generated and changes again so as to increase again the ignition advance angle at said predetermined rate from the value thereof at the time point at which the knock signal is disappeared.

15. An ignition retard angle control apparatus according to claim 14, wherein said predetermined rate of retarding said ignition advance angle is approximately 10 to 30 times that of increasing said ignition advance, in terms of the rate per second.

16. An ignition retard angle control apparatus according to claim 14, wherein the amplitude of said voltage signal is controlled such that it is fixedly maintained at a first amplitude value representing a first ignition timing when the output of said sixth means indicates that the engine is in a low speed range, wherein the amplitude of said voltage signal changes normally with time at a fixed rate from said first amplitude value toward a second amplitude value representing a second ignition timing advanced by a predetermined amount from said first ignition timing when a knock is not generated and changes when a knock is generated to go back from the instantaneous amplitude value at the time point where the knock is generated toward said first amplitude value by a predetermined amount in response to said knock signal and thereafter changes again with time toward said second amplitude value at said predetermined rate, when the output of said sixth means indicates that the engine is in a middle speed range, and wherein the amplitude of said voltage signal changes in a manner similar to that for said middle speed range, between said first amplitude value and a third amplitude value positioned intermediate said first and second amplitude values when the output of said sixth means indicates that the engine is in a high speed range.

* * * * *